March 29, 1938.     R. K. LEE     2,112,628
DIFFERENTIAL MOUNTING
Filed Jan. 25, 1934
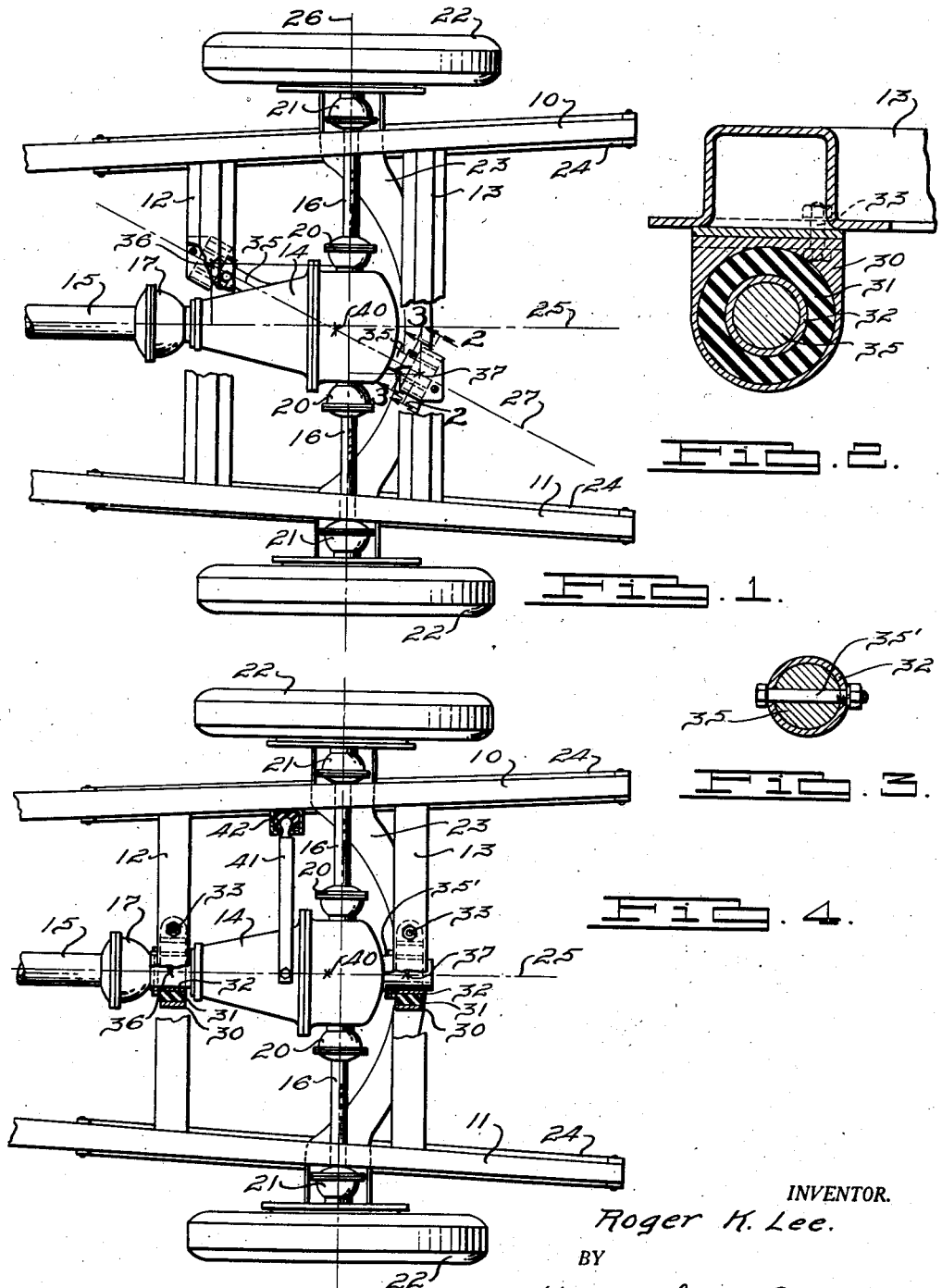
INVENTOR.
Roger K. Lee.
BY
Harness, Lind, Pater & Harris
ATTORNEYS.

Patented Mar. 29, 1938

2,112,628

UNITED STATES PATENT OFFICE 2,112,628

DIFFERENTIAL MOUNTING

Roger K. Lee, Highland Park, Mich., assignor to Chrysler Corporation, Detroit, Mich., a corporation of Delaware Application January 25, 1934, Serial No. 708,190

10 Claims. (Cl. 180—73)

This invention relates to automotive vehicles and more especially to improved differential mountings.

In the transmission of power through a differential mechanism, power impulses are transmitted through the differential and ring gear thereof in much the same manner that they are transmitted through an engine. When the differential mechanism is mounted on the frame of an automotive vehicle these power impulses cause reactions upon the frame which are directed substantially about both the axis of the main drive shaft and about the axis of the rear axle shaft. To overcome or minimize the effect of such reaction impulses the differential mechanism, according to the present invention, is yieldably mounted on the frame of the vehicle for oscillation about an axis passing through its center of mass.

A yieldably mounted differential mechanism is oscillated by the torque impulses which result from the application of thrust of the piston upon the main drive shaft following the individual explosion in the combustion chamber of the internal combustion engine, and these impulses occur in the same frequency as the explosion when the vehicle is in high or direct gear drive and at a more frequent rate in accordance with the gear ratio of the transmission gears when the vehicle is operated in lower gear drive. The differential mechanism is also oscillated substantially about the axes of the axle shafts by reaction impulses caused by varying loads exerted by the rear wheels of the vehicle upon acceleration or retardation of such vehicle. The yieldably mounted differential mechanism, like any other body, has a definite and fixed vibration rate or natural vibration frequency at which it will vibrate when once set in motion with respect to its support. The time of each oscillation of such body may be expressed by the formula.

$$T = 2\sqrt{I/C}$$

wherein: T=time, I=moment of inertia about its axis of oscillation, and C represents the resistance resiliently opposing angular displacement of the body. When the frequency of the torque impulses synchronizes with the natural frequency of the differential or a multiple thereof, the torque impulses are intensified and severe vibrations are developed. These vibrations affect the meshing of the differential gearing, causing noise and transmit vibrations through the frame and body of the vehicle so as to undesirably affect the smoothness and quietness of operation of the latter.

The magnitude of the torque applied to the vehicle frame by each oscillation is proportional to the displacement of the center of mass of the differential mechanism and may be minimized by having such differential mechanism oscillate about an axis which passes through its center of mass. In any body, the moment of inertia varies according to the position of the axis of oscillation with respect to the center of mass of the body. It is of the least possible value when the axis of oscillation passes through the center of gravity. Thus, the above arrangement reduces the moment of inertia of the system and reduces the time of each oscillation causing the body to vibrate at a higher natural frequency, as will become apparent from an inspection of the above formula. The reduction of the moment of inertia will reduce the intensity of the vibrations. The time of each oscillation may, however, be increased by decreasing the resistance resiliently opposing angular displacement of the differential mechanism and such resistance may be predetermined to avoid synchronizing the torque impulses of the engine and the natural vibration frequency of the differential mechanism within the driving range of the engine.

The principal object of the invention is to provide a mounting for supporting a differential mechanism relative to the frame of an automotive vehicle, which mounting is of such character as to prevent the transmission of excessive vibration and noise from the differential mechanism to the frame of the vehicle.

Another object is to provide a differential mounting which will permit oscillation of the differential under the influence of torque reaction impulses but will prevent substantial displacement of the center of mass of the differential during such oscillation.

A further object is to provide a differential mounting which reduces to a low value the amount of inertia of the differential mechanism.

Another object is to provide a differential mounting including yieldable members for independently supporting the weight of the differential mechanism and permitting oscillation of the differential mechanism about an approximately neutral axis.

Another object is to provide a differential mounting including resilient means for predetermining the natural vibration frequency of the differential mechanism.

Another object is to provide a differential mounting affording a single axis of oscillation disposed so that the natural tendency of the differential to rotate about both of two normally disposed axes is accommodated in turning about said single axis, said single axis extending at an angle to both natural axes and so disposed that rotation about one of the natural axes is opposed more than rotation about the other.

Other objects and advantages will become apparent from the following description and appended claims.

For the purpose of illustrating the genus of the invention, typical concrete embodiments are shown in the accompanying drawing, in which:

Fig. 1 is a top plan of the rear end portion of an automotive vehicle, in which the differential mechanism is supported on the frame of the vehicle by mounting means constructed and arranged in accordance with the principles of this invention;

Figs. 2 and 3 are enlarged sections taken on the lines 2—2 and 3—3 of Fig. 1; and Fig. 4 is a view similar to Fig. 1 of a further embodiment of differential mounting means.

Referring to the drawing, and especially to Figs. 1 and 4 thereof, there is illustrated a differential mechanism supported by the frame of an automotive vehicle, which frame includes side sill members 10 and 11, between which extend rigid transverse cross members 12 and 13. The cross members 12 and 13 may be rigidly connected to the side rails 10 and 11 in any suitable manner such as by welding or riveting.

Located between and slightly below the side rails 10 and 11 and the cross members 12 and 13 is a differential mechanism including an outside housing 14 enclosing the usual pinion connected to the main drive shaft 15, ring gear, differential casing, planetary gearing, and axle gears connected to the rear axle shafts 16. A universal joint 17 is interposed in the main drive shaft 15 adjacent the front end of the differential housing and universal joints 20 and 21 are interposed in each of the rear axle shafts adjacent the sides of the differential housing and adjacent the rear wheels 22 of the vehicle. The rear axle 23 extends between the rear wheels 22 and is preferably bowed in the central portion thereof so as to clear the rear end of the differential housing 14. A pair of springs 24 connect the side rails 10 and 11 with the axle 23 at points adjacent the rear wheels 22 to permit relative movement between the axle 23 and vehicle frame.

In the embodiment illustrated in Figs. 1, 2, and 3 of the drawing the differential mechanism is mounted upon an axis arranged at an angle with respect to the longitudinal axis, indicated by dot-and-dash line 25, of the main drive shaft 15 and with the axes of the rear axle shafts 16, indicated approximately by the dot-and-dash line 26. The axis of oscillation of the differential mechanism is indicated by the dot-and-dash line 27 in Fig. 1. Rigid supports in the form of metal bracket rings 30 are fixed to the cross members 12 and 13 upon the lower faces thereof and to one side of the front and rear ends of the differential housing 14. A hollow cylindrical rubber block 31 is disposed within each bracket ring 30 and a tubular metal sleeve is disposed within the rubber blocks 31. The bracket rings 30 are secured to the cross members 12 and 13 by any suitable means such as bolts 33. Preferably, the bracket rings 30 and tubular sleeves 32 are both attached to the rubber blocks 31 by vulcanization. The tubular sleeves 32 may be secured to aligned boss members coaxial with the axis of oscillation of the differential mechanism by means of bolts 35' extending through the tubular sleeve members and the boss members 35. The bracket ring 30, rubber block 31 and tubular sleeve 32 are preferably constructed as a unit and these units are assembled upon the ends of the bosses 35 and then bolted to the cross members 12 and 13. The rubber blocks 31 are made of substantial length so that points located at the midpoint of their lengths and at their centers of curvature might be considered the main axis locating points about which the differential mechanism may oscillate. These points are designated by the numerals 36 and 37, respectively, provided by the front and rear supports for the differential mechanism, and are located substantially in alignment with the center of mass of the differential mechanism, designated by the numeral 40, Fig. 1.

Since the axis of oscillation of the differential means passes substantially through the center of mass of the differential, the center of mass is not displaced during oscillation of the differential in response to torque impulses transmitted by the internal combustion engine of the vehicle and the main drive shaft 15, nor is the center of mass of the differential displaced by torque reaction impulses transmitted by the rear wheel axle due to acceleration or retardation of the vehicle. By avoiding the displacement of the center of mass of the differential mechanism incident to oscillatory movement of the latter in dissipating the torque reaction impulses either about the axis of the main drive shaft or about the axis of the rear axle, the torque reaction impulses are not suddenly opposed, and therefore the application of violent transversely directed thrusts or longitudinally directed thrusts upon the chassis frame is prevented. These torque reaction impulses are gradually dissipated during oscillation of the differential through substantial arcuate distances and are not suddenly opposed by a moment of large value which exists when the center of mass of the differential is located at a substantial distance from the axis of oscillation.

Since the differential is mounted for oscillatory movement about an axis that extends through the center of mass of the differential mechanism, the moment of inertia of the differential mechanism with respect to its axis of oscillation is reduced to a low value. This reduction in the moment of inertia would increase the natural vibration frequency of the differential to such an extent that such frequency would, if proper precautions were not taken, synchronize with the frequency of the torque impulses transmitted by the internal combustion engine during the driving range of operation of the engine. This condition would be highly undesirable, for when the torque reaction impulses are in phase with the natural vibration rate of the differential, the critical vibrations resulting would be transmitted to the frame and body structure of the vehicle.

The natural vibration rate of the differential is maintained low enough so that the frequency of the torque impulses during the driving range of operation of the engine will not synchronize with the natural vibration frequency of the differential. In the embodiment shown in Figs. 1 to 3, the natural vibration frequency of the differential is maintained at a sufficiently low rate by mounting the differential in the rubber blocks 31, which not only provide the axis of oscillation, but afford some resistance resiliently opposing angular displacement of the differential. The natural vibration rate of the differential may also be reduced by virtue of the angular disposition of the axis of oscillation with respect to the axis of the main drive shaft and with respect to the axes of the rear axle shafts. The resistance afforded by the rubber blocks 31 to angular displacement of the differential would be due to the torsional resistance of the rubber, exerted in opposing in a relative rotation of the tubular sleeve 32 with respect to the ring bracket 31. The torque impulses transmitted by the engine tend to rotate the differential mechanism about the axis 25 and will be opposed by the blocks 31. The angular arrangement of the axis 27 with respect to the axis 25 causes the blocks 31 to be tensioned or compressed at the tops or bottoms thereof and causes the diametrically opposite portions of the rubber blocks to be compressed or tensioned, respectively. The forwardly disposed rubber block 31 in opposing and dampening the torque impulses transmitted to the main drive shaft 15 has an effective lever arm equal to the distance from the point 36 to the axis 25 and normal with respect to the latter. The rearwardly disposed rubber block 31 in opposing and dampening the torque impulses transmitted by the main drive shaft 15 has an effective lever arm equal to the distance from the point 37 to the axis 25 perpendicularly with respect to the latter. The forwardly disposed block 31 in resisting torque impulses transmitted by the rear axle shafts 16 has an effective lever arm equal to the distance from the point 36 to the axis 26 and normal with respect to the latter. The forwardly disposed block in resisting these torque impulses is again placed under tension or compression at the upper or lower portions thereof while the diametrically opposite portions of the block are placed under compression or tension. The rearwardly disposed block 31 likewise has an effective lever arm equal to the perpendicular distance between point 37 and the axis 26 in resisting torque reaction impulses initiated by the rear axle upon acceleration or retardation of the vehicle. This block is also placed under compression and tension at diametrically opposite points thereon in resisting such torque impulses. The axis 27 is disposed at a greater angle with respect to the axis 26 of the axles 16 than with respect to the axis 25 of the main drive shaft 15 so that the effective lever arms extending longitudinally of the vehicle are greater than those extending transversely of the latter. Thus rotation of the differential mechanism about the axis 26 is opposed more than rotation about the axis 25.

With the above arrangement the yieldable elements 31 support the main weight of the differential and freely permit oscillation thereof about the axis of oscillation which extends at an angle with respect to both the main drive shaft and with respect to the rear axle shafts. By arranging the axis of oscillation at an angle with respect to these shafts, angular displacement of the differential about its neutral axis is resisted not only by the torsional resistance of the rubber block in preventing relative rotation of the tubular sleeve 32 with respect to the ring bracket 30 which places the fibers of the rubber block under tension and shearing stresses but is also resisted by the blocks under compression or tension benefited by effective lever arms equal in length to the perpendicular distances between the axes 25 and 26 to the axis locating points 36 and 37. By spacing the axis locating points 36 and 37 away from both the axes 25 and 26, the stresses imposed upon the rubber blocks 31 are less and the dampening effect is such that the natural vibration frequency of the differential is reduced to low value so that synchronism with vibration impulses initiated by the engine of the vehicle will not occur.

Referring to Fig. 4 of the drawing, the differential is mounted for oscillation about the axis 25 which also constitutes the axis of rotation of the main drive shaft 15. The yieldability of the blocks 31 permits oscillation about the main rear axle shafts as before. In addition to the resistance offered by the blocks 31 to angular displacement of the differential about the axis 25 in which the fibers of the rubber are placed in tension and in shear, the angular displacement resisting means may also include a rigid transversely extending arm 41 having one end fixed and the other end yieldably connected by a rubber cushion 42 to the differential and frame respectively, or vice versa. This angular displacement resisting means permits angular displacement of the differential about the axis 25 but reduces its natural vibration frequency to such a value that torsional impulses initiated by the engine and tending to cause vibration of the differential will be reduced to such a value that they will not synchronize so as to effect critical vibration in the differential mechanism. A flexible leaf spring could be employed instead of the rigid arm 41, if desired.

It will be noted that in Fig. 1 of an illustrated embodiment the center of mass of the differential mechanism has been illustrated as lying slightly to one side of the axis 25 of the main drive shaft. Conventional differential mechanism employed in motor vehicles have their mass asymmetrically distributed with respect to the axis of the main drive shaft due mainly to the weight of the ring gear. In the first illustrated embodiment the axis of oscillation passes directly through the center of mass of the differential mechanism so that the asymmetrical distribution of mass need be considered only in locating the bosses 35 so that the axis of oscillation does pass through the center of mass. In the embodiment shown in Fig. 4 of the drawing the axis of oscillation passes approximately through the center of mass of the differential and may be made to pass more closely therethrough by counterweighting the differential casing 14 on the side opposite the axis 25 from that in which the ring gear of the differential mechanism is disposed.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a vehicle including a frame, a main drive shaft, a pair of axle shafts, the combination of a differential mechanism connected to said main shaft and to said axle shafts, and mountings for said differential mechanism on said frame arranged on an axis extending through the center of mass of said differential mechanism and at an angle with respect to the axes of said main and said axle shafts, said mountings permitting oscillation of said differential mechanism about the axis upon which said mountings are arranged.

2. In a vehicle including a frame, a main drive shaft, a pair of axle shafts, the combination of a differential mechanism connected to said main drive shaft and to said axle shafts, and means on said frame including a pair of rubber members axially aligned on an axis extending at an angle to said drive shaft and said axle shafts mounting said differential mechanism and so constructed and arranged as to provide for oscillation about said axis extending substantially through the center of mass thereof so as to permit oscillation of said differential mechanism about said axis of oscillation under the influence of the torque reaction developed in rotating said main drive shaft against a load imposed on said differential mechanism by said axle shafts.

3. In a vehicle including a frame and a pair of axle shafts, the combination of a differential mechanism connected to said axle shafts, and mountings for said differential mechanism comprising a pair of resilient elements carried by the frame and engaged by said differential mechanism, said elements arranged on an axis passing substantially through the center of mass of said differential mechanism and resiliently to oppose angular movement of the differential mechanism about the axis through the mountings under the influence of torque reaction developed in rotating said axle shafts against a load.

4. In a vehicle including a frame, a main drive shaft, the combination of a differential mechanism connected to said main drive shaft, and aligned mounting members for said differential mechanism on said frame, arranged on an axis extending through the center of mass of said differential mechanism and at an acute angle with respect to the axis of said main shaft, said mounting members permitting oscillation of said differential mechanism about the axis upon which said mountings are arranged.

5. In a vehicle including a frame, a main drive shaft, and axle shafts extending at right angles to said main drive shaft, the combination of a differential mechanism connected to said main drive shaft and to said axle shafts, said axle shafts and drive shaft being arranged at right angles to each other, and a mounting for said differential mechanism including a plurality of rubber members carried by said frame and engaged by said differential mechanism at points between the axis of said main drive shaft and the axis of said axle shafts, said members being so formed and asymmetrically located relative to said main drive shaft as to determine and provide an axis of oscillation for said differential mechanism passing substantially through the center of mass thereof and arranged on a common axis extending at an angle to said drive shaft to permit oscillation of the differential mechanism about such axis of oscillation.

6. In a vehicle including a frame and a main drive shaft, the combination of a differential mechanism connected to said main drive shaft, and a pair of mountings for said differential mechanism comprising resilient members carried by the frame and engaged by said differential mechanism, said mountings arranged on an axis passing substantially through the center of mass of the differential mechanism and permitting oscillation of the differential mechanism about such axis of oscillation, said resilient means being located on a common axis which intersects the axis of said main drive shaft at an angle of less than a right angle to resiliently oppose angular displacement of the differential mechanism under the influence of torque reactions developed in rotating said main drive shaft against a load.

7. The combination of a differential mechanism for an automotive vehicle including a frame, a mounting for said differential mechanism comprising a plurality of resilient members carried by the frame and supporting substantially the entire weight of said differential mechanism, said members being located on a common axis, passing substantially through the center of mass of said differential mechanism and removed from the axis of said differential mechanism and being of such character as to oppose angular displacement of the unit about the axis of said resilient members, and other means free from the weight of said differential mechanism resiliently opposing angular displacement of the differential mechanism about the axis of said resilient members.

8. In a vehicle including a frame, a main drive shaft, a pair of axle shafts, the combination of a differential mechanism connected to said main drive shaft and to said axle shafts, and mountings providing an axis of oscillation for said differential mechanism on said frame arranged on a common axis extending at an angle of different magnitude with respect to the axis of the axle shafts than with respect to the axis of the main drive shaft.

9. The combination of a differential mechanism, supporting structure therefor, driving and driven elements having their axes disposed at an angle with respect to each other so as to tend to produce rotation of said differential mechanism about the axes of both driving and driven elements, and mounting members for said differential mechanism arranged on a common axis on said supporting structure and having the axis of the mounting members passing through the center of mass of said differential mechanism and extending at a greater angle with respect to the axis of one of said elements than with respect to the axis of the other element, said mounting members being resilient to permit oscillation of said differential mechanism about said axis.

10. In a vehicle including a frame, a main drive shaft, and a pair of axle shafts, the combination of differential mechanism connected to said axle shafts and to said main drive shaft, and mountings for said differential mechanism on said frame providing an axis of oscillation for said differential mechanism through the center of mass of said differential mechanism and arranged on a common axis extending at a greater angle with respect to the axis of the axle shafts than with respect to the axis of the main drive shaft, whereby said differential mechanism is permitted to oscillate about an axis passing through the center of mass of said differential mechanism.

ROGER K. LEE.